US006173729B1

(12) United States Patent
Dey et al.

(10) Patent No.: US 6,173,729 B1
(45) Date of Patent: Jan. 16, 2001

(54) SWITCH-OVER DEVICE

(75) Inventors: Uwe Dey, Delbrückstr. 34, D-12051 Berlin; Bernd Muller; Peter Hartwig, both of Berlin; Torsten Thiel, Fürstenwalde, all of (DE)

(73) Assignees: Uwe Dey; Bernd Mueller, both of Berlin (DE)

( * ) Notice: Under 35 U.S.C. 154(b), the term of this patent shall be extended for 0 days.

(21) Appl. No.: 08/553,095

(22) Filed: Nov. 3, 1995

(30) Foreign Application Priority Data

Nov. 4, 1994 (DE) ........................................ 44 40 663

(51) Int. Cl.[7] ........................................ F16K 11/02

(52) U.S. Cl. .......................... 137/113; 137/269; 137/557; 251/65

(58) Field of Search .............................. 137/112, 113, 137/557, 269; 251/65

(56) References Cited

U.S. PATENT DOCUMENTS

| | | | | |
|---|---|---|---|---|
| 3,203,439 | * | 8/1965 | Beckett | 251/65 X |
| 3,592,215 | * | 7/1971 | Davis | 137/113 |
| 3,633,606 | * | 1/1972 | Hay et al. | 137/113 |
| 4,018,244 | * | 4/1977 | Burns | 137/113 |
| 4,785,842 | * | 11/1988 | Johnson | 251/65 X |
| 4,944,324 | * | 7/1990 | Kajino et al. | 137/113 |
| 5,127,426 | * | 7/1992 | D'Archamband | 137/113 |

FOREIGN PATENT DOCUMENTS 2918791 11/1980 (DE) .

* cited by examiner

*Primary Examiner*—Stephen M. Hepperle
(74) *Attorney, Agent, or Firm*—Venable; George Spencer; Robert Kinberg

(57) ABSTRACT

A switch-over device which is useful for a gas insufflation device using liquid gas includes at least two inflow channels each blockable by a valve and at least one outflow channel for alternate removal of a fluid medium from a plurality of containers. The device has a switch-over piston movably mounted in a housing and comprising a base member which has at each end a valve closure member in a form of a body of rotation. The switch-over piston is driven by a pressure difference between the fluid media and connects one of the inflow channels to the outflow channel in each of two switching positions. A working chamber accommodates the switch-over piston, with sealing elements being provided for closing off the inflow channels in a pressure tight manner when the switch-over piston is in the correspondingly closed position and for dividing the working chamber into two portions sealed off from each other. The switch-over piston and/or the working chamber is constructed so that at least one sealing element can be arranged selectively in different positions. The size of the areas of the switch-over piston which are acted upon by the fluid media and determined the switch-over point is determined by the position of the sealing element.

23 Claims, 7 Drawing Sheets

SWITCH-OVER DEVICE

BACKGROUND OF THE INVENTION

A invention relates to a switch-over device, preferably usable for a gas insufflation device using liquid gas, having at least two inflow channels, each blockable by a valve and at least one outflow channel for alternate removal of a fluid medium from a plurality of containers, and having a switch-over piston movably mounted in a housing and comprising a base member which has at each end a valve closure member in the form of a body of rotation, this switch-over piston being driven by a pressure difference between the flulid media and connecting one of the inflow channels to the outflow channel in each of two switching positions, and with a working chamber which accommodates the switch-over piston, sealing elements being provided for closing off the inflow channels in a pressure-tight manner when the switch-over piston is in the correspondingly closed position and for dividing the working chamber into two portions sealed off from each other.

Switch-over devices for equipment are known which operate with a pressure medium which can be removed from a plurality of pressurised containers, for example a gas from gas bottles. The switch-over device provided ensures that a pressurised container which has been emptied, apart from a certain residue, is disconnected from the plant system and at the same time a full pressurised container is connected up without interrupting the operation of the plant system.

From German patent 29 18 791, a switch-over device is known with which it is possible to remove a pressurised liquid or gaseous medium from batteries of bottle cells or containers in alternating manner. The switch-over device comprises two valve-controlled inlet channels and one outlet channel. Switching the outlet channel from one inlet channel to the other is effected by the fluid medium using a switch-over piston which has a valve closure member at each of its two ends. The corresponding valve seatings are arranged in a chamber which accommodates the switch-over piston within the housing of the switch-over device and are constructed as bushings have a ring seal. The valve closure member is formed by a pin which engages in the correspondingly shaped recess in the bushing when the valve is shut. The end face of the switch-over piston is supported simultaneously on the bushing which forms the valve seating. The fluid medium which brings about the switch-over applies pressure, at the end where the valve is open, to the entire and face of the switching piston, whereas at the end where the valve is closed, only the end face of the valve closure member is subjected to the entry pressure. The chamber which accommodates the switch-over piston is connected, at both ends of the switch-over piston, with a pressure relief valve by means of which the corresponding chamber area can release its pressure into the output line of the switch-over device which supplies the consumer.

The solution described above has the major disadvantage that the desired method of operation is ensured only for a specific flow medium and for given pressure conditions for the switch-over. The use of the switch-over device for a different flow medium and different switch-over conditions requires a different construction both of the switch-over piston and of the housing of the switch-over device.

SUMMARY OF THE INVENTION

Starting from the deficiencies of the prior art an object aim of the invention is to provide a switch-over device of the kind described above which is of simplified construction and which can be adapted without any major constructional problems to different conditions of use, for example when a different fluid medium is to be used or to suit different switch-over conditions.

The above and other objects are accomplished in the context of a switch-over device of the type first described above wherein the switch-over piston and/or the working chamber is constructed so that at least one sealing element can be arranged selectively in different positions, the size and the areas of the switch-over piston which are acted upon by the fluid media and determine the switch-over point, being determined by the position of sealing element.

The invention includes the finding that the force which moves a switch-over piston at a given pressure is directly proportional to an area acted upon by the pressure and, in the case of a switch-over piston having portions of substantially cylindrical or frustoconical construction, the square of a change in diameter goes into the corresponding change in the effective cross-sectional area or circular outer surface area acted upon by a given pressure. Thus, relatively large changes in the effective surface area can be achieved in favourable manner with relatively small changes in diameter.

According to the preferred embodiment of the invention, in a switch-over device having two valve controlled inflow channels and one outflow channel there is provided a switch-over piston having a substantially cylindrical base member at the ends of which are provided, as rotational members, valve closure members constructed to decrease constantly in diameter in the axial direction. The switch-over piston is axially movably mounted within a housing with a suitable mounting of the base member in a working chamber and, as it assumes each end position, it leaves one inflow channel or the other. The particular end position of the switch-over piston is determined by the difference in the pressures in the containers connected to the switch-over device, which contain the particular fluid medium.

The size of the pressure difference at which the switch-over piston moves axially to leave one of the inflow channels and thereby establish a fluidic connection between the other inflow channel and the working chamber, can be adjusted by means of the construction of the valve closure members in connection with the choice of position of the sealing elements used.

Therefore, two sealing elements are provided at the periphery of at least one of the valve closure members. The shape of the sealing elements and their relative axial position determine the size of the area on the switch-over piston which is acted upon by the fluid pressure prevailing in the particular container which is to be connected in the switching operation and, hence, by the force required for axial movement of the switch-over piston. In accordance with the radial dependency of the effective area, the force required for switch-over, and hence the switch-over time or switch-over pressure, can also advantageously be achieved comfortably by changing the position of the sealing elements relative to one another, step by step, in the direction of the longitudinal axis of the switch-over piston. Valve closure members in the form of a truncated cone which tapers in the direction of the free end of the switch-over piston and terminating in a cylindrical pin are particularly advantageous.

According to an advantageous feature of the invention, one of the pins abuts with its end face on the wall of the working chamber in spring loaded manner, so that the switch-over piston assumes a predetermined position which opens the valve of the corresponding inflow channel, irrespective of the pressure, without the switch-over device already being attached to a battery of bottle cells. Because of this constructional feature, the switch-over device is also suitable for systems which have to be supplied with a fluid medium, wherein switch-over is only to a reserve container, for example to supply breathable air to a diver.

O-rings, piston or flange seals may be provided as the sealing elements. O-rings are particularly useful since they can be positioned securely in annular grooves formed in the outer surface of the frustum-shaped valve closure members. For reliable sealing of the inflow channels by means of these valve closure members, which are advantageously self-centering, two sealing elements are provided, inserted in annular grooves, with different axial positions.

The sealing elements consist of VITON fluoroelastomer, EPDM, TEFLON polytetrafluoroethylene, KALREZ perfluoroelastomer, or ZALAK elastomer but preferably polyurethane.

According to an advantageous further feature of the invention, more than two, preferably four, annular grooves are incorporated in the valve closure member in question, so that different relative spacings between the two O-rings in the axial direction can be selected for each of the valve closure members without any great effort and without any modification of any kind to the housing of the switch-over device. As a result, the cross-sectional surface areas which are effective for axial movement of the switch-over piston can be selected comfortably and the switch-over device can be tailored to different switch-over pressures or different fluid media, whilst using the same construction for housing parts and the same switch-over piston.

The outflow channel of the switch-over device, through which the flow medium is supplied to a consumer, is tied into the working chamber in the region of the mounting of the base member. The mounting of the base member of the switch-over piston is such that there is always a fluidic connection between the outflow channel which is tied into the working chamber in the region of the mounting of the base member, and the inflow channel which is opened up by the relevant valve closure member.

In order to achieve a desirable speeding up of the switch-over process, according to a further feature of the invention an annular permanent magnet is provided in the wall area of the working chamber which forms the valve seating. The valve closure members consisting of a ferromagnetic material, are subjected to the effect of the magnetic field during the switch-over process at a certain distance from the valve seating and are aided in their movement towards the closed position. The use of an electromagnet or the combination of a permanent magnet with an electromagnet favourably permits control of the accelerating force and thereby provides a possible control for the switch-over point of the apparatus.

According to another advantageous feature fo the invention, at least one groove like overflow channel is provided in the walls of the working chamber of the switch-over device, in the region of the base member mounting. This is a simple way of ensuring that the fluidic connection between the outflow channel, which is tied into the working chamber in the region of the mounting of the base member of the switch-over piston, and the inflow channel to the switch-over device, which is freed by the particular valve closure member, can be maintained without affecting the mounting; this fluidic connection is necessary for uninterrupted switching of the outflow channel to one of the two inflow channels.

In order to avoid the formation of a pressure cushion in the valve area of the inflow channel which is to be closed, during the switch-over process, which would affect the closing operation, according to another advantageous feature of the invention an overflow channel is provided in the wall area of the working chamber adapted to fit the valve closure members and forming the valve seating. Each overflow channel is provided with a spring loaded pressure relief valve through which any possible pressure cushion can escape either into the inflow channel or into the atmosphere surrounding the switch-over device. The piston of the pressure equalising valve is mounted to be axially movable counter to the force of one or two spring elements, in order to block or open an outflow line, depending on the particular pressure conditions. A change in the spring constant of the spring or springs situated in the pressure relief valve leads not only to a change in the response point of the pressure relief valve but also to a change in the pressure at which the switch-over device responds. It is useful to load the piston of the pressure relief valve with the pressure prevailing in the inflow channel, as a counter pressure, in order to prevent vibration occurring during the switch-over process.

According to another feature of the invention, the pressure relief valves are constructed to be operated manually or actuated by the valve closure members.

In an overflow channel leading into the inflow channel there is pressure equalisation with the atmosphere when, after a switch-over operation, a container which has been emptied apart from a residual amount of the fluid medium is exchanged for a completely full one. If the container has not bee changed, there is alternate, almost total emptying, of the two containers connected to the switch-over device.

According to a further feature of the invention, it is advantageous to close off the exit from the overflow channel with a cylindrical pin of sintered material. The porosity of the sintered material allows any pressure cushion which has formed, during the switch-over process between the wall of the working chamber and the valve closure member, in the region between the sealing elements arranged at the periphery of the valve closure member, to be broken down without causing excess escape of fluid medium from the overflow channel.

According to an additional feature, the switch-over device according to the invention has measuring means by which the pressures prevailing in the inflow channels can be measured. At the same time, optical and/or acoustical indicating means are provided for displaying the particular switching condition of the switch-over device in order to signal the need to change containers. In particular, to make the switch-over device suitable for use in the medical field, the measuring and indicating means are integrated in the housing wall of the compact switch-over device.

The constructional solution described above for a device for switching over a consumer of fluid media attached to a battery of bottle cells, without any interruption, which may be used in medical technology for gas insufflation equipment using liquid gas, h as the major advantage that the switch-over device can be modified for all kinds of application simply by selecting the position of the sealing elements required in the switch-over device and by choosing the spring means for the pressure relief valves, whilst all other components remain essentially the same. Modular construction of the housing will reduce the manufacturing costs for a range of different switch-over devices still further .

BRIEF DESCRIPTION OF THE DRAWINGS

Advantageous features of the invention are described below with reference to the drawings, wherein.

DETAILED DESCRIPTION OF THE INVENTION

Figure 1:
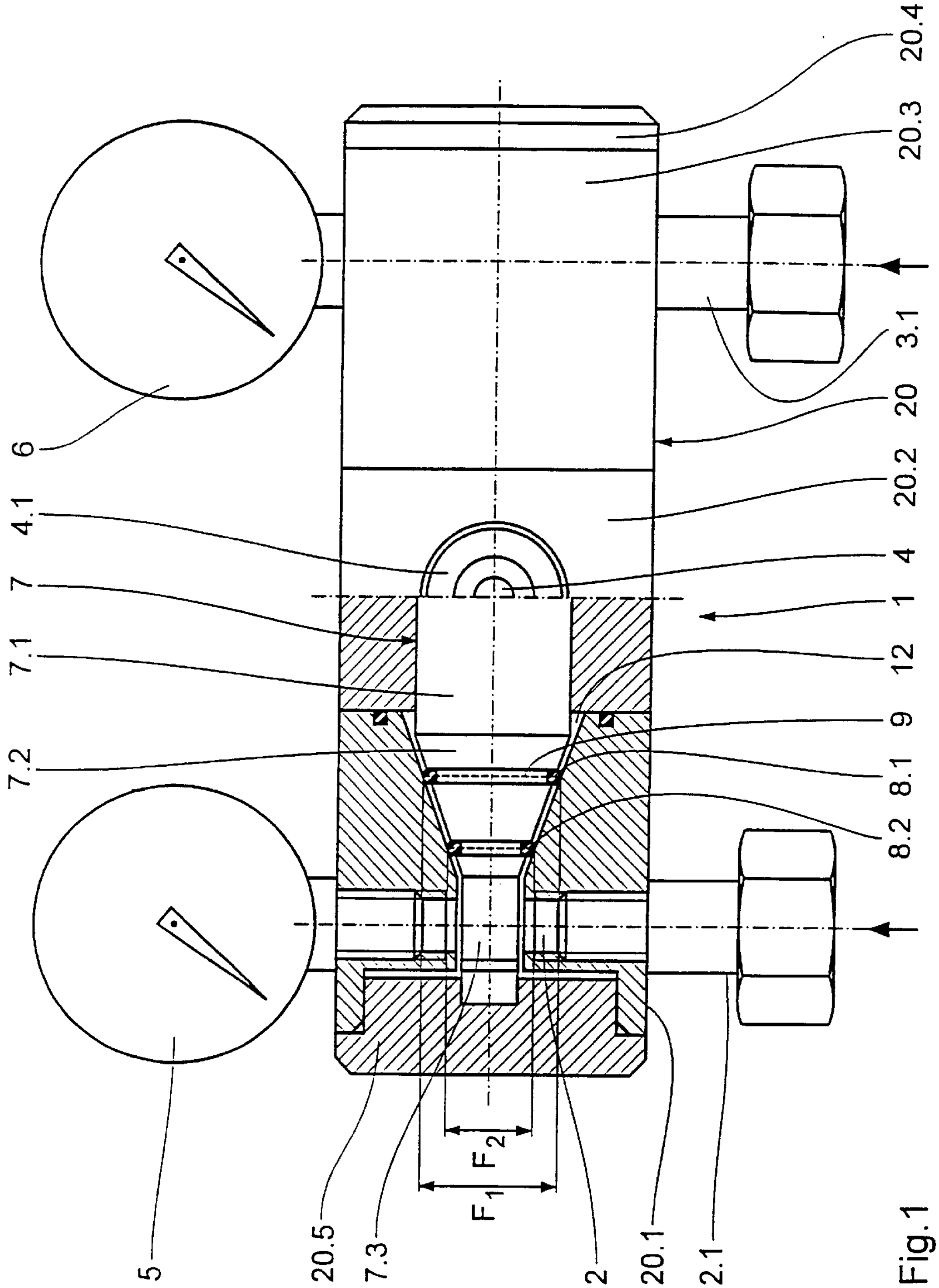
FIG. 1 is a partial sectional view of the preferred embodiment of the invention.

The switch-over device 1 shown in FIG. 1 has a modular housing 20 with a working chamber 12. In the working chamber 12, a switchover piston 7 is mounted so as to be axially movable. A sliding bearing is provided within the working chamber 12 for the cylindrical base member 7.1 of the switchover piston. The base member 7.1 has, at each of its ends, a frustum-shaped valve closure member 7.2 terminating in a cylindrical pin 7.3. The containers (not shown) for the fluid medium to be consumed are connectable to the switchover device 1 by means of connecting nozzles 2.1, 3.1. The connecting nozzles 2.1, 3.1 each lead through an inflow channel 2 and 3 (see FIG. 2) into the working chamber 12. The outflow channel 4 is tied into the working chamber 12 in the region of the mounting of the switchover piston 7 and is connectable, via a connecting nozzle 4.1, to a consumer (not shown). Manometers 5, 6 are provided for detecting the pressure of the fluid medium in the inflow channels 2 and 3.

The working chamber 12 is formed by the housing modules or elements 20.1, 20.2, 20.3, 20.4 and 20.5 of the modular housing 20. The conically tapering valve closure member 7.2, together with the similarly tapering working chamber wall of the housing module 20.1, constructed as the valve seating, forms a valve which is shown in the closed position, separating the inflow channel 2 from the working chamber 12. The two O-rings 8.1 and 8.2 which are inserted in annular grooves provided at the periphery of the valve closure member 7.2 in different axial positions secure the inflow channel 2, in the region of the valve closure member 7.2, against pressure equalisation with the fluid pressure prevailing in the working chamber, since the corresponding valve for the inflow channel 3 is open. The position of the switchover piston 7 and the time of switching the connection of the inflow channel 2 or 3 to the outflow channel 4 depend on the difference in pressure of the fluid medium in the inflow channels 2 and 3 and on the ratio of the areas F1 and F2. The size of the areas F1 and F2 acted upon, on the one hand, by the pressure in the inflow channel 2 and, on the other hand, by the pressure prevailing in the working chamber 12, results from the selected position of the O-rings 8.1 and 8.2. The force which moves the switchover piston 7 is formed by the resultant of the individual forces acting in the opposite direction on the switchover piston, the magnitude of which can be determined substantially by the sub-division of the outer surface of the valve closure member 7.2 into three individual surfaces 15.1, 15.2, 15.3, by means of the O-rings 8.1 and 8.2

Figure 2:
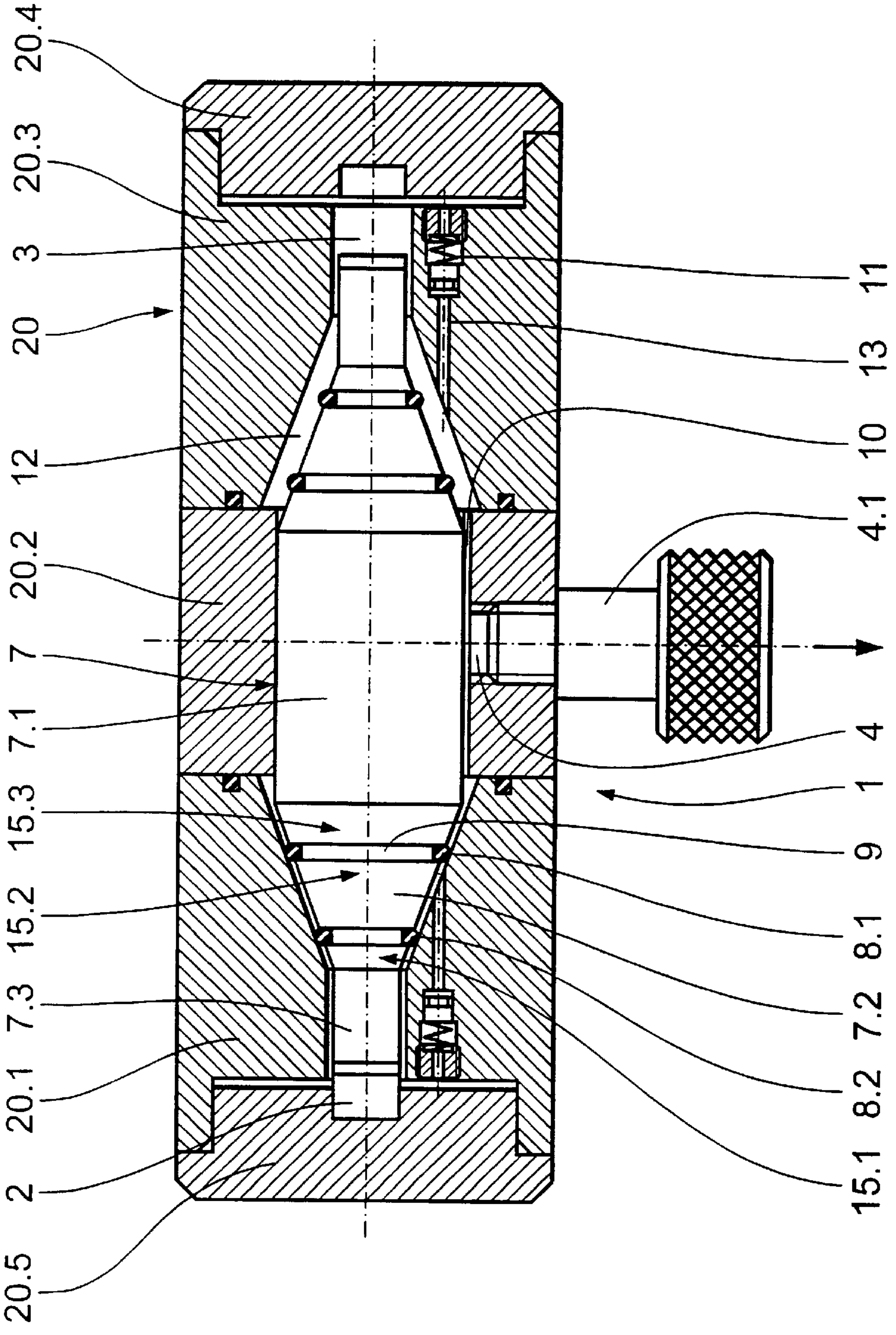
FIG. 2 is a longitudinal sectional view of the embodiment of the invention shown in FIG. 1 after 90° rotation about the longitudinal axis.

The longitudinal section shown in FIG. 2 through the switchover device 1 according to the invention shows the position of the outflow channel 4. The outflow channel 4, through which the flow medium is supplied to a consumer which can be connected by means of the nozzle, is tied into the working chamber 12 in the region of the mounting of the base member 7.2. In the region of the mounting of the base member 7.2 of the switchover piston 7, the wall of the housing module 20.3 which forms part of the working chamber 12 has an axially extending groove 10, so that, in the position of the switchover piston 7 shown, there is a fluidic connection between the outflow channel 4 and the inflow channel 3 opened up by the valve closure member. After the switchover operation has occurred, the groove 10 ensures a corresponding fluidic connection between the inflow channel 2 and the outflow channel 4. The two annular grooves 9 of the frustom-shaped valve closure members 7.2 are each lined with an O-ring 8.1, 8.2, in accordance with a selected switchover pressure.

The position of the switchover piston 7 shown in FIG. 2 is obtained when the inflow channel shown on the right of the drawing (cf. position 3 in FIG. 1) is connected to a gas container and the second inflow channel remains free. This piston position is also obtained when a corresponding gas container with substantially equal internal pressure is connected to the second inflow channel (cf. position 2 in FIG. 1). When the switchover piston 7 is pushed to the left, in the plane of the drawing, with the inflow channel 3 open, the entire outer surface of the valve closure member 7.2 (on the right of the drawing), the end face of the pin 7.3 and the circular area of the part of the O-ring 8.1 projecting from the wall of the frustum (cf. position $F_1$ in FIG. 1) is acted upon by the pressure of the fluid medium. The surface which can be acted upon by the pressure in the closed inflow channel (on the left) (cf. position $F_2$ in FIG. 1) is substantially smaller and is formed by the end face of the pin 7.3, the partial outer surface 15.1 of the valve closure member 7.2 and the circular surface of that part of the O-ring 8.2 which projects out of the wall of the frustum. As a result, the position of the switchover piston 7 is stable whilst the internal pressure of the container connected up remains substantially the same, and on account of the resulting compressive force which is directed to the left. If the internal pressure of the container connected to the outflow channel 4 gradually decreases as the fluid medium is used up, the switchover piston 7 moves to the right, after the direction of effect of the resultant of the force is reversed.

The moment of switching of the piston 7 (and hence the degree of emptying of the first container connected) can easily be adjusted, whilst maintaining the geometric dimensions of the individual housing modules of the housing 20 and switchover piston 7, by using a different number, for example when only one O-ring 8.1 is used, i.e., by thus changing the relative position of the sealing elements 8.1 and 8.2 at the periphery of the valve closure members 7.2 (and thereby changing the effective surface area on the valve closure member of the closed inflow channel). Similarly, the switchover device is thus also adjustable for use with different fluid media.

In the wall areas of the working chamber 12 which accommodate the valve closure members 7.2, there is a pressure equalising line 13 having a pressure relief valve 11. This construction is necessary in order to break down the level of pressure which builds up during the switchover process in the space between the outer surface of the valve closure member, particularly in the area bounded by the ring seals 8.1 and 8.2, and the wall of the working chamber 12 forming the valve seating. This advantageously ensures precise switchover and prevents any possible vibrations which might affect the switching operation. The breakdown of pressure advantageously takes place in the almost empty containers (not shown) which therefore have a relatively low internal pressure. When the containers are changed, air escapes from the pressure equalising line 13.

Figure 3:
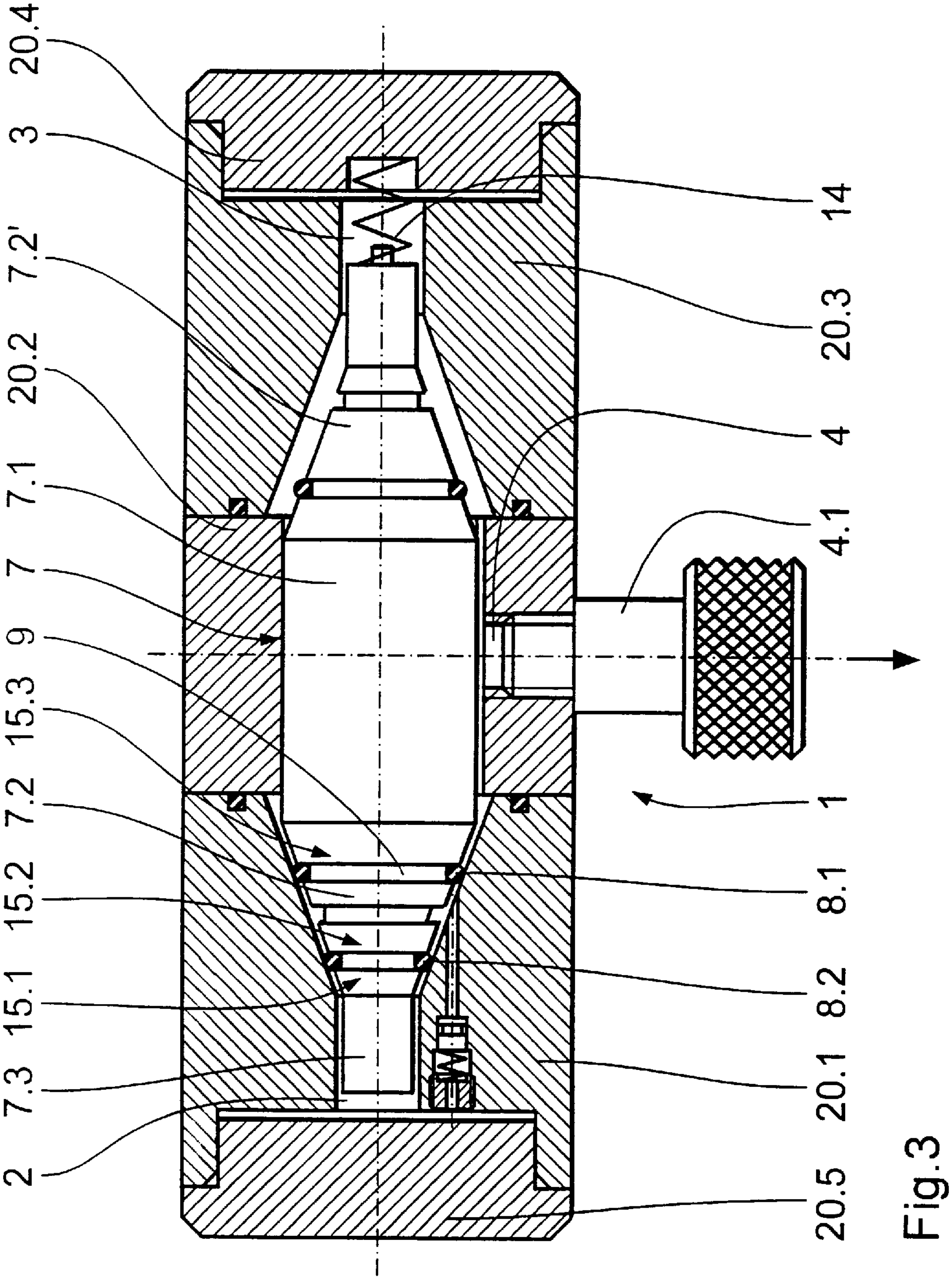
FIG. 3 is a longitudinal section through an advantageous further feature of the embodiment of the invention shown in FIG. 2.

The sectional view of a favourable embodiment of the invention shown in FIG. 3 has a switchover piston 7 in which one of the cylindrical pins 7.3 located at the free end rests with its end face on the wall of the working chamber 12, via an intermediate compressed helical spring 14 having a small spring constant. This results, on the one hand, in a predetermined position of the switchover piston 7 for a switchover device 1 which is not connected to containers, and on the other hand allows the switchover point of the device 1 to be changed by a suitable choice of spring constant. A large spring constant gives the advantage that the container connected first can be substantially emptied.

The switchover piston 7 has two valve closure members 7.2 and 7.2' of different constructions, which differ in the number and axial position of the annular grooves 9 for receiving the corresponding sealing elements 8.1 and 8.2. As a result, with suitable positioning of the sealing elements and using only some of the available annular grooves, it is possible to choose several switchover points for the piston 7.

Figure 4:
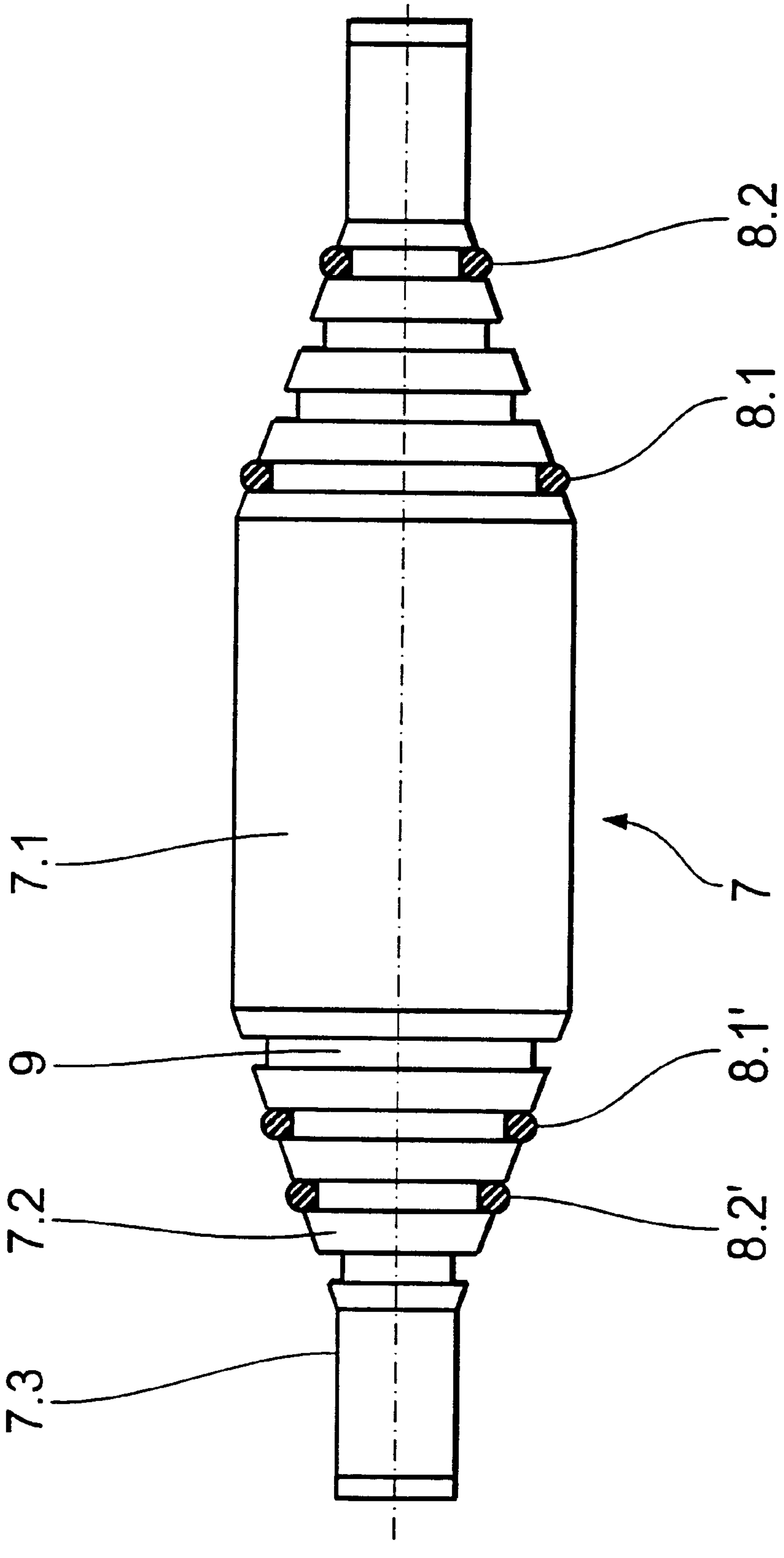
FIG. 4 shows another advantageous embodiment of a component shown in FIGS. 1, 2 and 3, in longitudinal section.

The manufacture of switchover devices which permit the desired switching under different pressure conditions or are suitable for use with different flow media is advantageously possible at reduced cost using the construction according to the invention, since the housing 20 can be assembled in modular fashion from the essentially constant individual components 20.1, 20.2, 20.3, 20.4 and 20.5 and only the switchover piston 7 or helical spring 14 has to be modified according to the particular application FIG. 4 shows, as an advantageous further feature of the invention, a switchover piston 7 the valve closure members 7.2 of which have four annular grooves 9 in their outer surface, only two of which are fitted with an O-ring 8.1, 8.1', 8.2, 8.2' as the sealing means. The different positioning of the O-rings 8.1' and 8.2', compared with the representation in FIGS 1, 2 and 3, leads to a different effective surface on the valve closure member 7.2 associated with the particular inflow channel which is closed.

A frustum-shaped valve closure member 7.2 not only presents favourable opportunities for positioning the sealing elements but also advantageously allows self-centering within the valve seating formed by the housing wall, thanks to the conical tapering.

Further constructional solutions for the switchover device according to the invention can be obtained by a suitable choice of height for the frusto-conical valve closure member 7.2 or the number of annular grooves 9. This permits finer sub-division of the pressure stages for the switchover or enables the switchover device to be used for a larger number of different fluid media.

Figure 5:
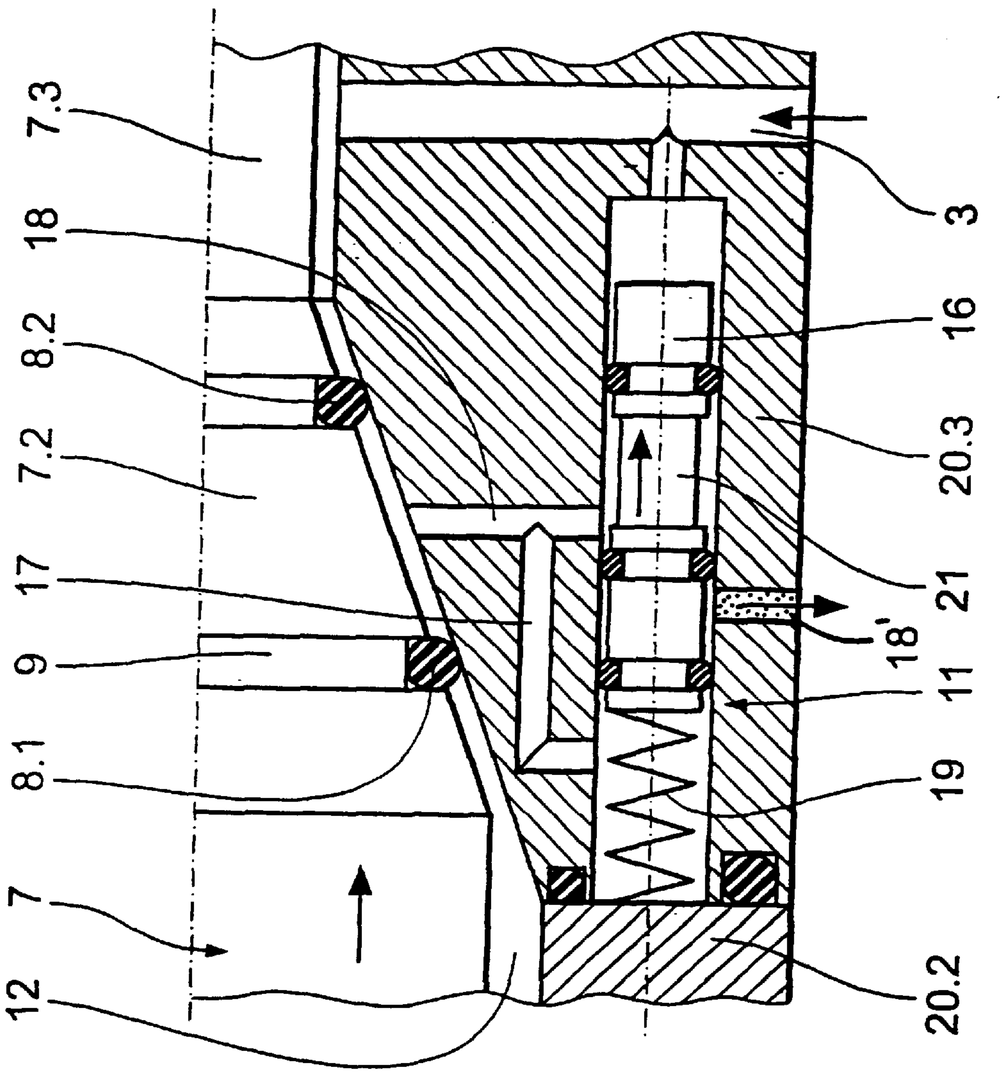
FIG. 5 shows a detail of another embodiment of the invention.
Figure 6:
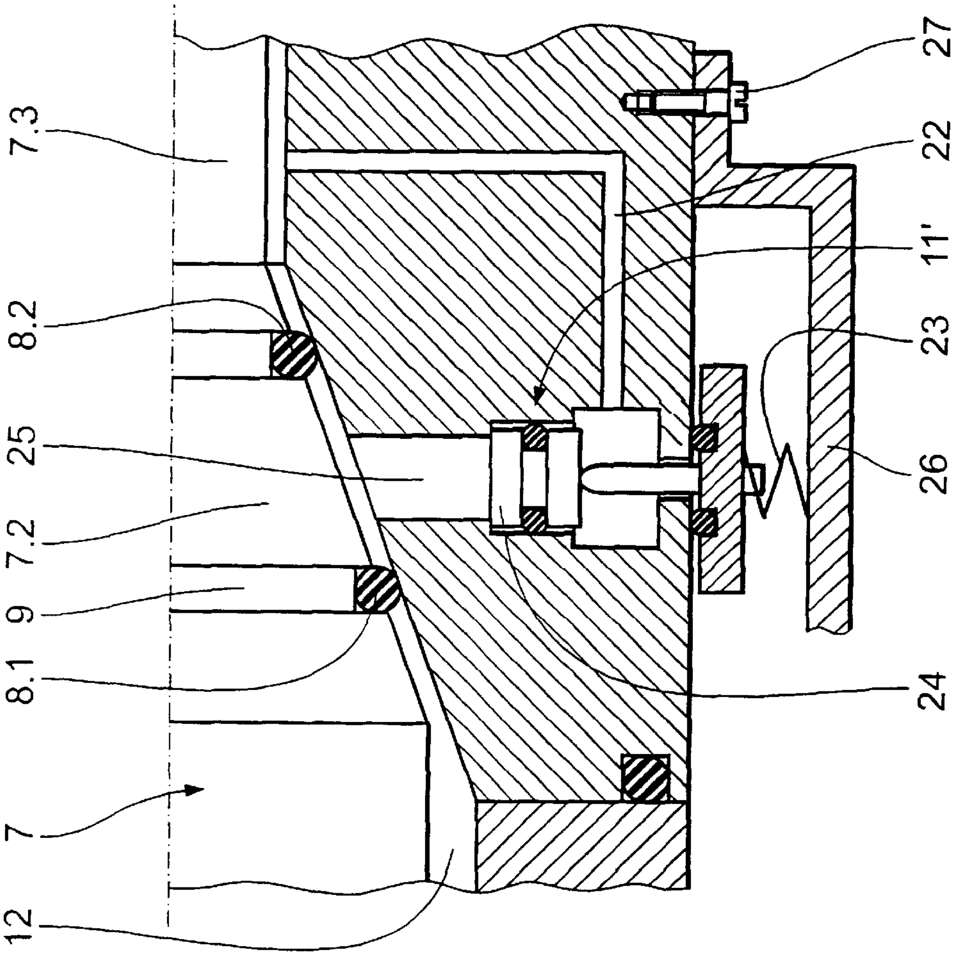
FIG. 6 shows a favourable feature of the embodiment of the invention shown in FIG. 5.
Figure 7:
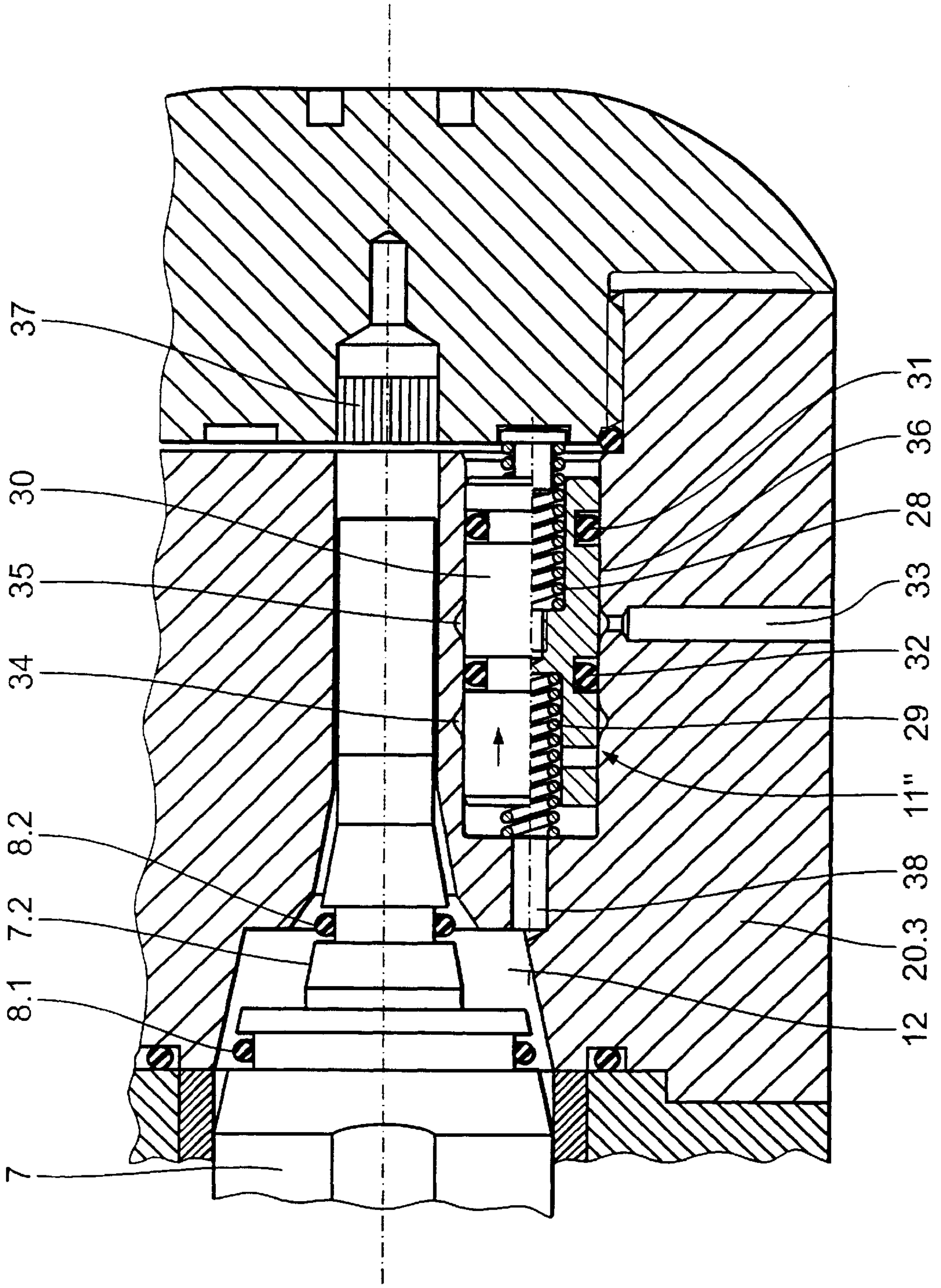
FIG. 7 shows a different embodiment of the invention illustrated in FIG. 5.

FIGS. 5, 6 and 7 show alternative constructions for the arrangement and configuration of pressure relief valves, in order to break down the level of pressure which forms during the switchover process in the region between the sealing elements 8.1 and 8.2 at the valve closure members 7.2 and the housing wall of the particular inflow channel which is to be closed off. This presents this level of pressure from influencing the switching process and thereby prevents any harmful vibrations from occurring.

The pressure equalisation valve 11 shown in FIG. 5 is arranged in the housing module 20.3 and has an axially movably mounted piston 16 mounted by means of seals. The piston 16 is held in the position shown by a spring 19 fixed to one of its ends and supported at one end on the hosing module, and blocks the equalisation (outflow) line 19 leading into the atmosphere surrounding the switchover device. When the inflow channel 3 is open both ends of the piston are acted upon by the internal pressure of the container connected to the inflow channel 3. During a switchover process the switchover piston 7 is moved to the right in the direction of the arrow shown, and a pressure cushion builds up in the space between the two ring seals 8.1 and 8.2 of the valve closure member 7.2 and the wall of the working chamber 12 in the region of the equalisation line 18. This pressure level acts on the spring loaded end of the piston 16 via the line 17. The piston 16 moves to the right, in the direction of the arrow, counter to the internal pressure of the container and thereby frees the equalising line 18 via the groove 21. The pressure level in the space enclosed by the wall of the working chamber 12 and the outer surface in the region between the sealing rings 8.1, 8.2 is broken down. Desirably, equalising line 18 has a closure 18' in the form of a cylindrical pin of sintered material to facilitate breaking down of any pressure formed during the switchover without causing excess escape of fluid medium from the equalisation line 18.

The equalising line 25 which leads, according to FIG. 6, into the atmosphere surrounding the switchover device, contains a pressure equalising valve 11', the piston 24 of which is mounted to be movable along the axis of the line 25. The piston 24 is held in the closed position shown by a plate which seals off the equalising line 25 from outside and by a loading of the internal pressure of the container at both ends through the lines 22 and 25. The plate which closes off the equalising line is held in position by a spring element 23 which is supported on a cap 26 fixed to the housing of the switchover device by means of a screw connection 27. Any pressure level formed during the switchover operation is safely broken down, in the same way as described above.

The pressure equalising valve 11" shown in FIG. 7 is mounted in the housing module 20.3 and has a piston 30 which is arranged so as to be axially movable and mounted by means of seals 31, 32 in the form of O-rings. The piston 30 is held in the resting position as shown by means of two springs 28, 29, each inserted in a cylindrical recess provided at its ends and resting with its other end on the housing module, and blocks the equalising line 33 which leads to atmosphere. When the inflow channel is open, both ends of the piston are acted upon by the internal pressure of the container connected to the inflow channel. During a switchover operation, the switchover piston 7 is moved to the right in the direction of the arrow shown, and a pressure cushion is built up in the space between the two ring seals 8.1 and 8.2 of the valve closure member 7.2 and the walls of the working chamber 12. This excess pressure acts through the channel 38 on the corresponding end of the piston 30. The piston 30 moves to the right in the direction of the arrow counter to the pressure of the spring and the internal pressure of the container until the seal 32 reaches the annular groove 35. Once this has happened, a connection is established, via the annular slot then surrounding the seal, between the channel 38 and the outflow line 33, by means of which the pressure in the space originally enclosed by the walls of the working chamber 12 and the outer surface in the region between the sealing rings 8.1, 8.2 can escape. This piston position is taken up when an empty gas supply container has been removed from the switch-over device.

When a full gas supply container is connected to the corresponding connecting nozzle, the pressure conditions at the piston surfaces of the pressure equalising valve 11" are reversed. This results in a movement of the piston counter to the direction of the arrow to the left until the seal 32 reaches the annular groove 34 and a flow path is thereby opened up between the working chamber 12 and the outflow line 33 and the pressure build up can be released. An annular or cylindrical magnetic element 37, which could be either a permanent magnet or an electromagnet, is provided to aid the movement of the switch-over piston 7.

The invention is not restricted to the preferred embodiment described above. Rather, numerous alternatives are possible which make use of the solution illustrated, even though the constructions may be of fundamentally different kinds.

What is claimed is:

1. In a switch-over device, preferably usable for a gas insufflation device using liquid gas, having at least two inflow channels each blockable by a valve and at least one outflow channel for alternate removal of a fluid medium from a plurality of containers, and having a switch-over piston movably mounted in a housing and comprising a base member which has at each end a valve closure member in the form of a body of rotation, this switch-over piston being drive by a pressure difference between the fluid media and connecting one of the inflow channels to the outflow channel in each of two switching positions, and with a working chamber which accommodates the switch-over piston, sealing elements being provided for closing off the inflow channels in a pressure tight manner when the switch-over piston is in the correspondingly closed position and for dividing the working chamber into two portions sealed off from each other, the improvement wherein the switch-over piston and/or the working chamber is constructed so that at least one sealing element can be arranged selectively in different positions, the size of the areas of the switchover piston which are acted upon by the fluid media and determine the switch-over point, being determined by the position of the sealing element.

2. Switch-over device according to claim 1, wherein at least one of the valve closure members has a diameter which decreases in the direction of the corresponding end of the switch-over piston and the working chamber has a correspondingly constructed end portion acting as a valve seating and two sealing elements with different diameters and axially spaced from one another are arranged on the periphery of this valve closure member.

3. Switch-over device according to claim 2, wherein the diameter of the valve closure members changes continuously.

4. Switch-over device according to claim 3, wherein the valve closure members are constructed as truncated cones which taper in the direction of the end of the switch-over piston.

5. Switch-over device according to claim 4, wherein the valve closure member merges into a cylindrical guide pin.

6. Switch-over device according to claim 1, wherein the outer surface of the valve closure member is constructed so that the sealing element can be placed in different axial positions.

7. Switch-over device according to claim 6, wherein the casing of at least one of the valve closure members has a plurality of concentric annular grooves, two of which are provided for selectively receiving a sealing element.

8. Switch-over device according to claim 1, wherein the mounting of the base member the switch-over piston is such that there is a fluidic connection between the outflow channel which opens into the working chamber in the region of the mounting of the base member and the inflow channel which is opened up by the relevant valve closure member.

9. Switch-over device according to claim 8, wherein the wall of the working chamber has at least one groove-like overflow channel in a region of the mounting of the base member.

10. Switch-over device according to claim 6, wherein an O-ring, a piston seal or a flange seal is provided as the sealing element.

11. Switch-over device according to claim 10, wherein the sealing elements are made from one of VITON fluoroelastomer, EPDM (ethylene propylene diene monomer), TEFLON polytetrafluoroethylene, KALREZ perfluoroelastomer, ZALAK elastomer, and polyurethane.

12. Switch-over device according to claim 1, wherein a pressure relief valve is provided in an outflow line by means of which the working chamber is connected to the atmosphere surrounding the switch-over device.

13. Switch-over device according to claim 12, wherein the outflow line has a closure of sintered material.

14. Switch-over device according to claim 12, wherein the overflow line of the pressure relief valve opens into the container for fluid medium attached thereto.

15. Switch-over device according to claim 12, wherein the pressure relief valves are designed to be operable by the pressure in the working chamber, manually or by means of a valve closure member.

16. Switch-over device according to claim 15, wherein the pressure relief valves are constructed as non-return valves and have a piston with sealing means inserted therein, which is mounted to be movable counter to at least one spring element.

17. Switch-over device according to claim 15, wherein the sealing means are constructed as O-rings.

18. Switch-over device according to claim 16, wherein, provided in the walls of the pressure relief valve, there are annular grooves which cancel the sealing action of the O-rings when the latter move into the area of the annular grooves as the piston moves.

19. Switch-over device according to claim 18, wherein one of the annular grooves is connected to the outflow line.

20. Switch-over device according to claim 18, wherein in the housing wall of the switch-over device, there are measuring means for detecting the pressure in the inflow channels and optical and/or acoustical means for indicating the present switching state.

21. Switch-over device according to claim 1, wherein magnetic means are provided for aiding the movement of the switch-over piston.

22. Switch-over device according to claim 1, wherein the magnetic means comprises cylindrical or annular magnetic elements mounted on the respective ends of the working chamber forming the valve seating in the housing wall.

23. Switch-over device according to claim 1, wherein the housing is made up of a plurality of individual modular elements.

* * * * *